Nov. 5, 1968     W. STRACHAUER ET AL     3,408,844
APPARATUS FOR THE PRODUCTION OF BENT, SERPENTINE-SHAPED FINNED
PIPE REGISTERS FROM CROSS-ROLLED FINNED PIPES
Filed April 12, 1966     8 Sheets-Sheet 1
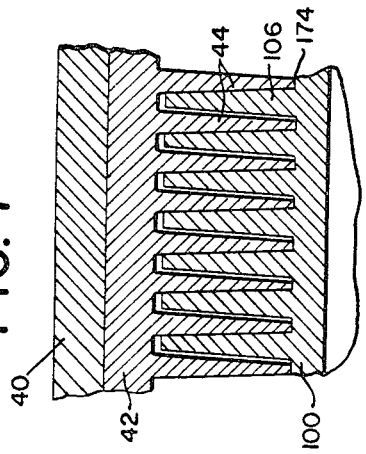
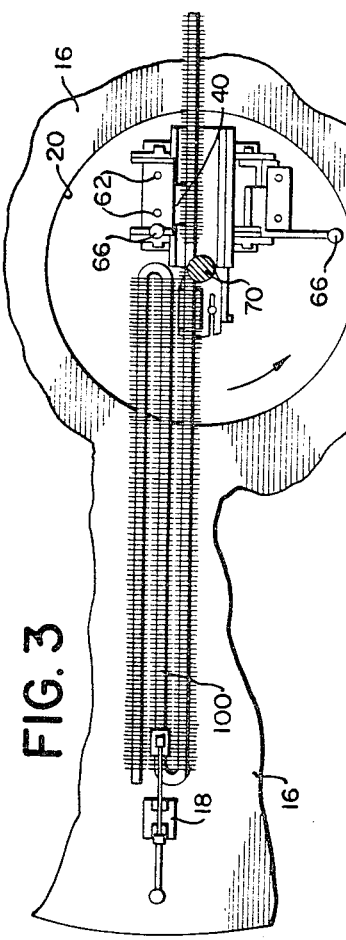
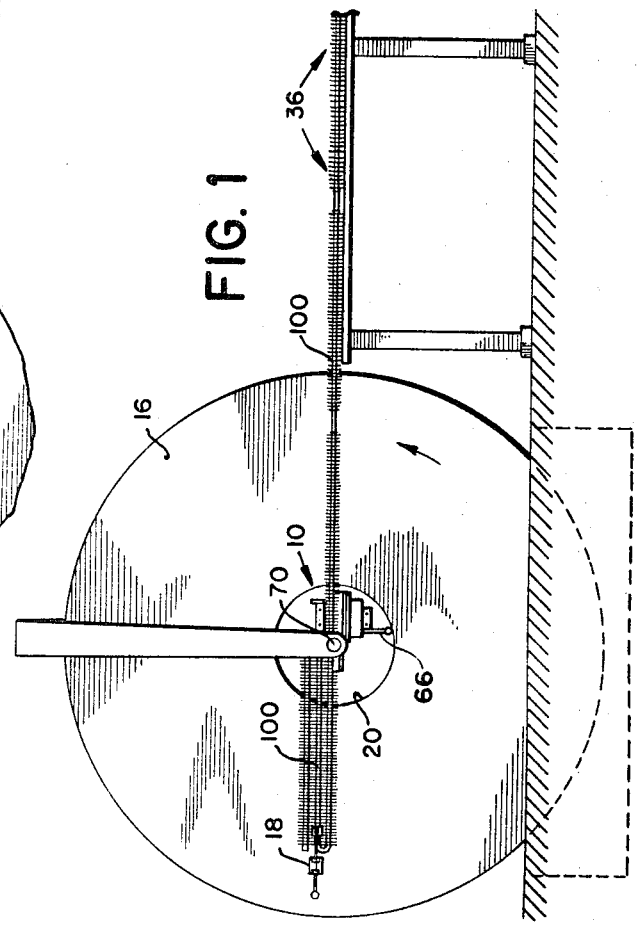
INVENTORS
WALTER STRACHAUER
WERNER HENZE
BY
AGENT

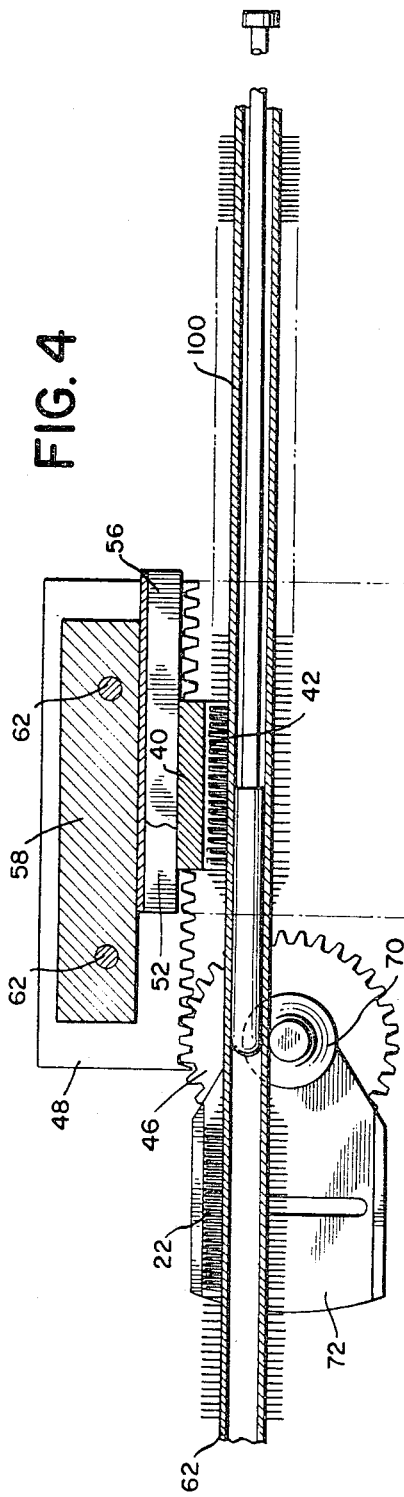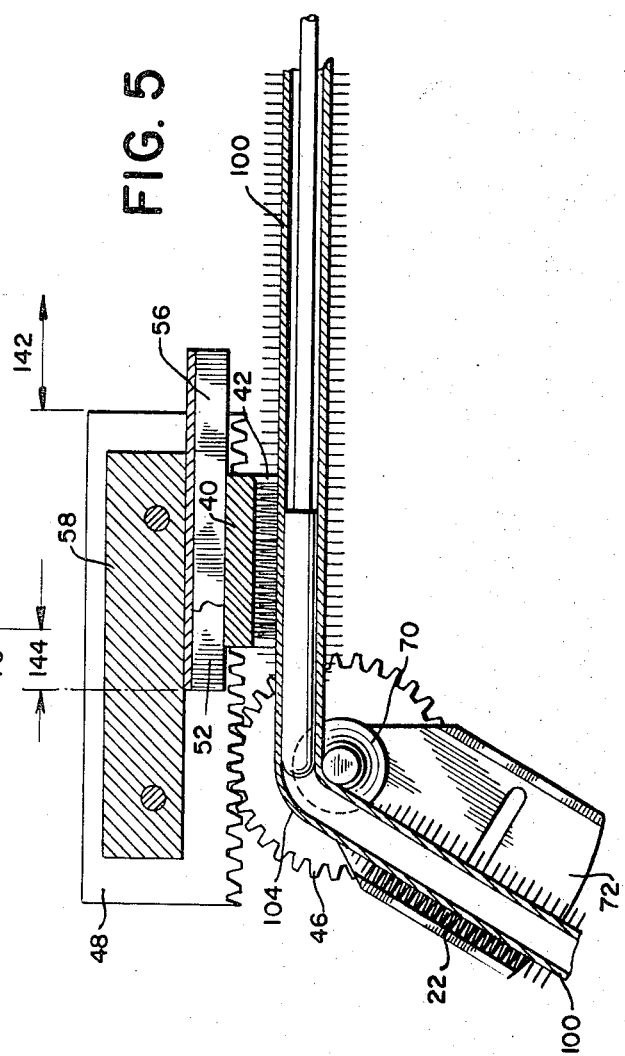

Nov. 5, 1968 W. STRACHAUER ET AL 3,408,844
APPARATUS FOR THE PRODUCTION OF BENT, SERPENTINE-SHAPED FINNED
PIPE REGISTERS FROM CROSS-ROLLED FINNED PIPES
Filed April 12, 1966 8 Sheets-Sheet 5

INVENTORS
WALTER STRACHAUER
WERNER HENZE
BY
AGENT

INVENTORS
WALTER STRACHAUER
WERNER HENZE

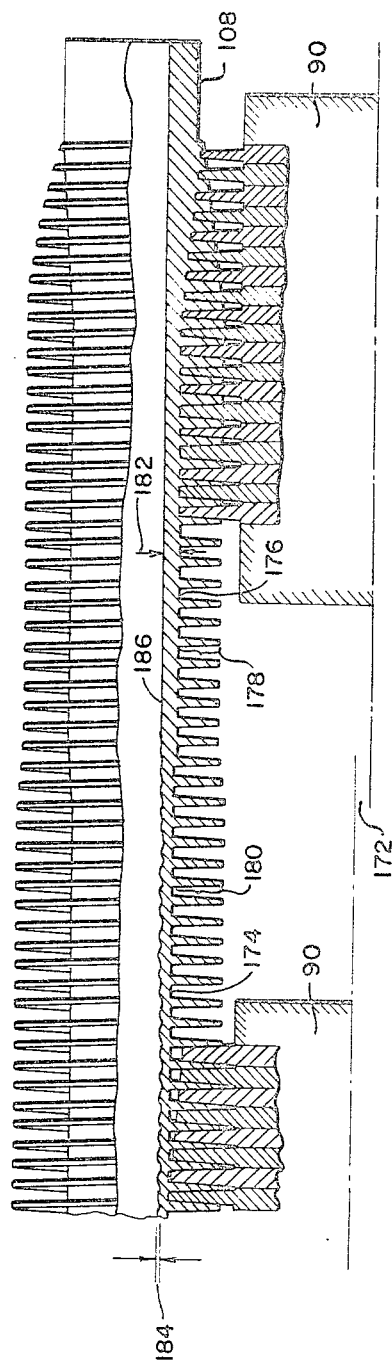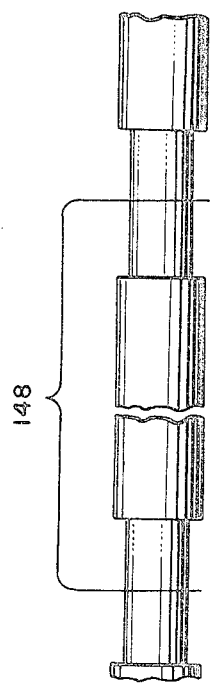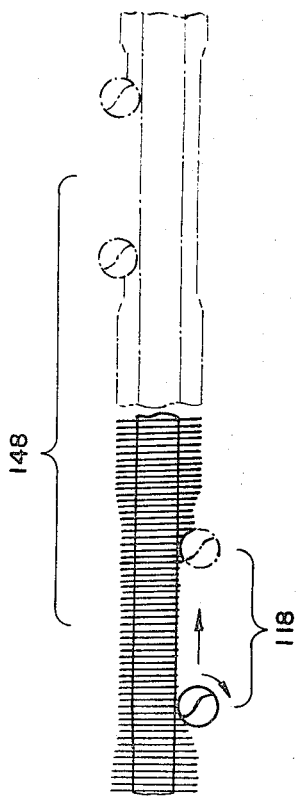

3,408,844
APPARATUS FOR THE PRODUCTION OF BENT, SERPENTINE-SHAPED FINNED PIPE REGISTERS FROM CROSS-ROLLED FINNED PIPES
Walter Strachauer and Werner Henze, Halle an der Saale, Germany, assignors to Veb Maschinen- und Apparatebau Schkeuditz, Schkeuditz, Germany
Filed Apr. 12, 1966, Ser. No. 542,111
6 Claims. (Cl. 72—150)

ABSTRACT OF THE DISCLOSURE

Apparatus for making pipe registers for heat exchangers, comprising a rotatable bending disk having a central opening, mechanism for feeding cross-rolled finned pipes to the bending disk, including a bending shaft concentric with said opening, a driven bending shaft concentric with said opening, and a drive mechanism for operating the disk and the bending shaft so that bends of predetermined angles can be made, in alternating opposite directions, by actuating the bending disk to which the free end of the pipe is preferably attached by way of a clamping device.

---

The invention relates to an apparatus for the production of serpentinely bent finned pipe registers from cross-rolled finned pipes, particularly for heat exchangers, such as in refrigerating and air-conditioning systems.

There are known heat exchangers made of externally finned pipes connected at their ends by welded or soldered pipe bends. These methods of production have the disadvantage that the junctions of the pipe bends with the finned pipes easily develop leaks which can be ascertained only when testing the completed heat exchanger, and which may lead to considerable refinishing or even to rejects. Moreover, accumulations of welding material bring about cross-sectional constrictions and flow disturbances within the junctions, owing to which the output of the heat exchangers is reduced.

The minimum permissible bending radius in the manufacture of the pipe bends is determined by the tensile stress occurring in the outer pipe-bend wall during the bending operation. To avoid the tensile stress, the resulting crack formation, as well as a great reduction of the pipe-wall thickness, it has been proposed to exert a pressure on the outer wall of smooth pipes in the direction of the longitudinal axis during the bending operation.

Pipe bending devices of the aforesaid design have the disadvantage that they can be used only for the bending of relatively short and smooth pipes which have no external fins. In the case of great pipe lengths, which are required for the manufacture of pipe coils or serpentines, there is danger of buckling, as the feeding force acts at the outer pipe end. Light-metal pipes are particularly exposed to this danger since they have a low buckling stiffness.

In the manufacture of heat exchangers, cross-rolled finned pipes of light metal are preferred because of their good deformation property in the formation of the fins. The pipes are provided over their entire length with a spirally extending, very thin fin, and to avoid deformations of the fins, the low strength of the material must be borne in mind. Devices of known model have the disadvantage that the feeding equipments and their adjusting mechanisms are very costly and moreover do not take into consideration the great sensitivity of the soft materials. In the feeding operation, the pipe must be gripped at the smallest possible distance from the bending point to eliminate the danger of buckling the pipe, as the feeding force reaches relatively high values in order to bring about the upsetting of the material in the bending zone.

It is the object of the present invention to provide an apparatus for producing endless finned pipe registers for heat exchangers in such a way that the leakages caused in the known production methods on account of the plurality of junctions, as well as the aforesaid disadvantages of the known bending devices, are eliminated.

The main object of the invention is to bend in a novel apparatus and by a suitable process cross-rolled pipes having external fins with such small radii that parallel sections of pipe registers can be produced for heat exchangers with attainment of a small external volume, lying very closely side by side in serpentine form, from a single pipe length, without junctions between the pipe bends.

In the apparatus according to the invention, according to one of the major features, a feeding device is arranged in the immediate vicinity of the pipe bending point, which consists of a pinion secured to a bending shaft and two racks, as well as of a compensating friction clutch for each, firmly connected with jaws for bending the pipe. The clutches consist of a T-strip, a block, a clamping part, as well as a brake lining, and is selectively lowerable into an opening arranged in the center of a revolving disk.

According to another feature of the invention, the bending shaft is provided at its end face with a split bending roll as well as with a support for receiving a lower clamping jaw part, and can be retracted below the revolving disk plane, preferably by means of a hydraulically moved guiding wedge, and turned back to the zero or starting position by a drive formed by a rack and a gear.

According to yet another feature of the invention, the revolving disk has its axis slightly inclined toward the horizontal plane and can be turned by 180 degrees in both directions of rotation, jointly with the bending shaft, in the same direction and with the same speed.

According to the invention, the lower clamping jaw part is fastened on the support, secured on the end face of the bending shaft, for displacement tangentially to the bending radius, in an angle of 90 degrees to the pipe axis.

Also according to the invention, the bending jaws are arranged to be flapped down alternately from the gripped finned pipe.

According to another characteristic of the invention, both the lower clamping jaw and the bending jaws are provided with screw thread-shaped half-shells, whose thread turns receive the pipe fins with the necessary tolerance corresponding to the finned pipe cross-section so that the feeding force acts on the basic outside pipe diameter.

In operating the apparatus according to the invention, a single, smooth pipe length is reduced to a basic outside pipe diameter, at predetermined distances of bending points, by machining with or without material removal. Subsequently the pipe is provided with a helically extending fin of varying height, corresponding to the pipe diameter, on a finned-pipe rolling machine known per se. After the rolling operation, the pipe is soft annealed at the bending points, and finally received in the apparatus according to the invention, and bent in alternate directions so as to assume a serpentine form.

The wall thickness of the basic pipe is increased, in the pipe section having a reduced basic outer diameter, by the wall-thickness difference to the wall thickness in the pipe section having a large outside fin diameter, as there are no corrugations in this section.

According to an alternative manner of operating the inventive apparatus, a single, smooth pipe is provided with a helically extending fin of varying height at distances of bending points, by the stroke of the roll sets of a finned-pipe rolling machine, during the cross-rolling operation, the fin height resulting from the difference in material displacement. Thereafter, at the pipe sections having a reduced fin height, the fin is alternately removed, preferably by machining with material removal, the outside diameter of the basic pipe being at the same time slightly flattened. Following the operation, the pipe sections partly devoid of fins (where the fin height was reduced) are soft annealed and finally bent into serpentine form.

According to another feature of the invention, in the last described operation, the wall thickness of the basic pipe is increased in the section with reduced fin height by the stroke of the roll sets of the finned-pipe rolling machine and by the shaft depth, as in this section the inside diameter of the pipe undergoes only very weak corrugations.

Another characteristic of the invention consists in that in either of the inventive operations, the average distances between the pipe sections, and twice the average bending radius of the serpentinely bent finned pipe sections, correspond at least approximately to the outside fin diameter of the straight pipe sections arranged side by side in substantially parallel relation in the finished finned pipe registers.

The various objects, features and attendant advantages of the inventive apparatus will become more apparent from the following description of a preferred exemplary embodiment of the apparatus for producing bent, serpentine-shaped finned pipe registers from cross-rolled finned pipes, when considered in conjunction with the accompanying drawings, wherein:

FIG. 1 is an overall frontal view of the apparatus for producing pipe registers according to the invention;

FIG. 3 is a somewhat enlarged frontal view of the feeding device forming part of the inventive apparatus;

FIG. 4 is an enlarged sectional view of the feeding device, in one phase of the bending operation, with a straight pipe section in place, both FIGS. 4 and 5 being taken along line 4–5, 4–5 of FIG. 6;

FIG. 5 is a view similar to that of FIG. 4, but in another phase of the bending operation, where the pipe section has been partly bent;

FIG. 7 is an enlarged, sectional representation of a screw thread-shaped half-shell forming part of the structure appearing in FIGS. 4 and 5;

FIG. 13 is an elevational view of a smooth pipe section having portions reduced to the basic outside diameter;

FIG. 14 is a schematic illustration of a finned pipe during the cutting operation, and serving to illustrate an alternative manner of operation, together with FIGS. 15 to 18;

FIG. 15 is a partly sectional longitudinal view, somewhat similar to that of FIG. 8, of a finned pipe section during the rolling operation in a known apparatus;

In the following, the inventive apparatus will be described first, to be followed by the explanation of the two preferred variants of the pipe bending operations according to the invention.

Figure 10:
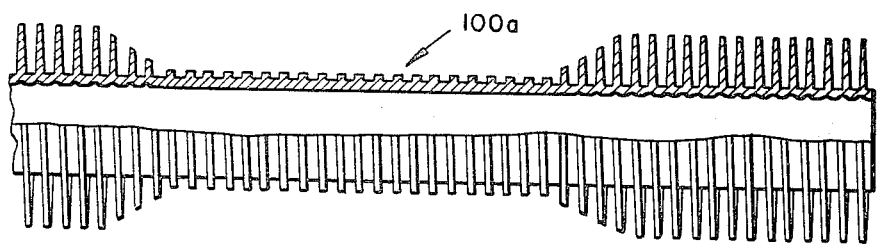
FIG. 10 is a partly sectional view of a finned pipe section with a portion having reduced fin height.
Figure 12:
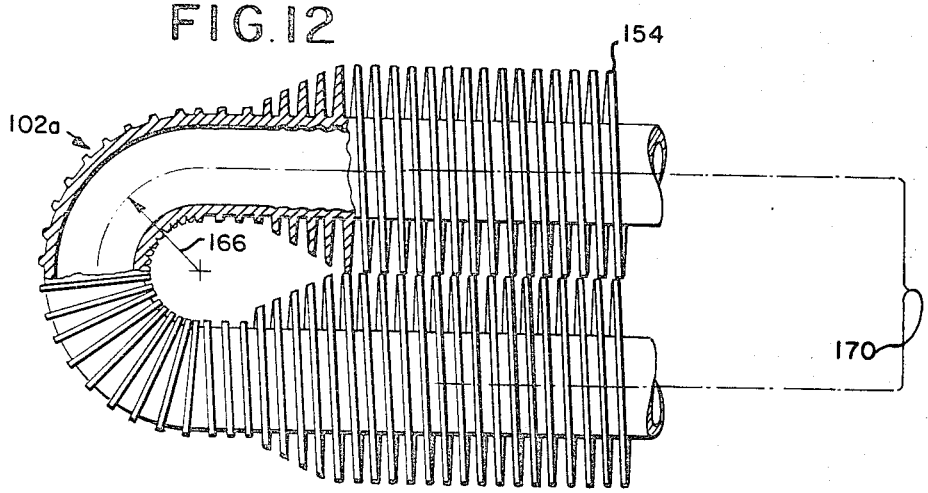
FIG. 12 shows a partly sectional, completed pipe bend of a finned pipe, made according to the preferred manner of operating the inventive apparatus.
Figure 16:
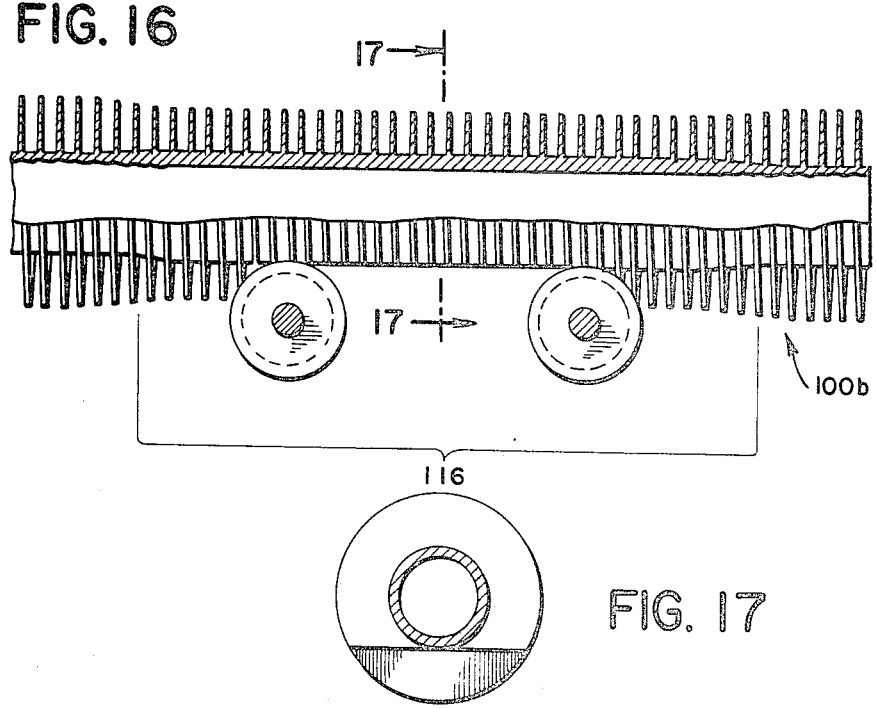
FIG. 16 is again a partly sectional view of the bending point of a finned pipe during the cutting operation.
Figure 18:
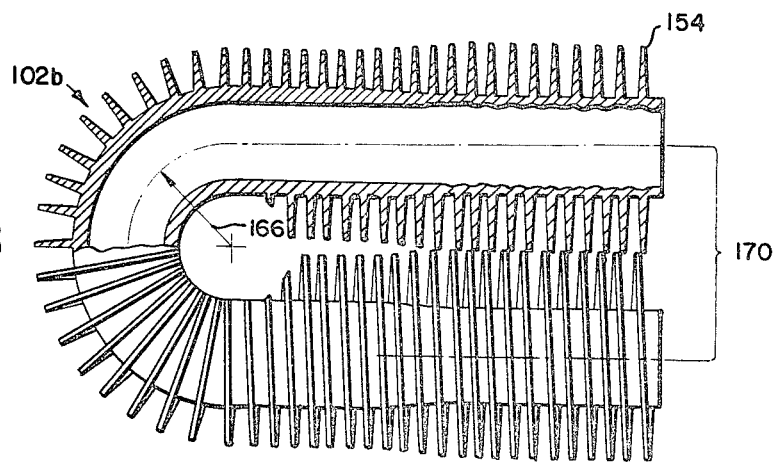
FIG. 18 again shows a partly sectional, completed pipe bend of a finned pipe, made according to the alternative manner of operation.

The apparatus illustrated in FIGS. 1 to 7 serves to make bends in finned pipes, like those shown in FIGS. 10 and 16, and identified respectively by numerals 100a and 100b, resulting in respective bent sections 102a and 102b, as shown in FIGS. 12 and 18. Other elements and parts of the finned pipe sections will be referred to as the description proceeds; the essential features and structural details will be pointed out when dealing with the inventive process.

The apparatus consists essentially of a feeding device 10, a bending shaft 12 with a retrieving device, a drive mechanism 14, as well as of a revolving disk 16 with a clamping device 18.

Figure 6:
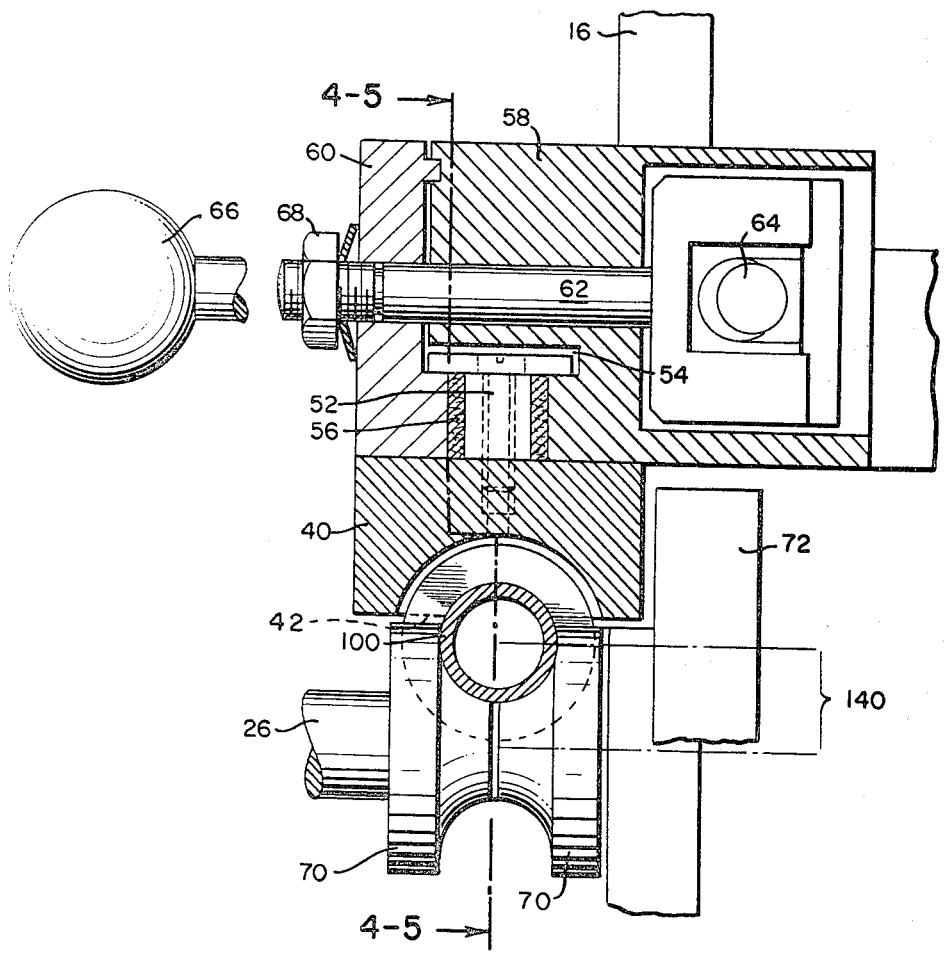
FIG. 6 is an enlarged, partial, vertical sectional view of the adjusting device for regulating the feeding force of the bending jaws, in the same plane as that of FIG. 2.

The feeding device 10 is shown in FIGS. 3 to 5; FIG. 6 represents a vertical sectional view of some elements, together with those of the adjusting device. The feeding device 10 is arranged in the center of the revolving disk 16 in an opening or cut-out 20. This opening is cut out from the center of the disk 16, and the bending shaft 12 protrudes through this opening 20 with lower and upper clamping jaw parts 22, 24, respectively, to be described somewhat later in detail. The upper clamping jaw part 24 is associated with a spindle sleeve 26. The shaft 12 has a pinion 28 and a gear 30 attached thereto, to which further reference will be had as the operation of the apparatus is described. The pinion 28 is adapted to engage a rack 32 associated with a hydraulic operating cylinder. Another cylinder 34 acts on another rack 36, for operating the disk 16 and the bending shaft 12. FIG. 1 also shows a conventional support mechanism 38 for the finned pipe to be bent, and identified here only by numeral 100.

The respective bending jaws 40 (FIGS. 3 to 7) are alternately lowerable and can be flapped down from the finned pipe 100. In the representation according to FIG. 2, the upper bending jaw 40 is in operation, while the lower jaw 40 is flapped back and is countersunk in the plane of the revolving disk 16.

As FIG. 7 shows, the bending jaws 40 and the lower part 22 of the clamping jaw are provided with screw thread-shaped half-shells 42 which fit with tolerance between the fins rolled on in thread form. The half-shells 42 have thread turns 44. The feeding force is produced, as is visible from FIGS. 4 and 5, by the difference between the pitch circle radius of the pinion serration 46 and the mean bending radius 140, as well as the difference resulting therefrom between the stroke 142 of racks 48, 50 and the mean bend length at the pipe bend 104.

A compensating friction clutch firmly connected with the bending jaws 40 transmits the feeding force, adjustable to the corresponding pipe dimension, to the finned pipe 100. As FIG. 6 shows, the bending jaws 40 are screwed tight to T-shaped strips 52. These strips slide in a T-groove 54 equipped with a brake lining 56. The groove 52 is machined in a block 58 and, provided with a clamping part 60, forms the compensating friction clutch. The clamping part 60 is tightened by way of two clamping screws 62 by means of an eccentric 64. A hand lever 66 is disposed outside the eccentric system, as illustrated in FIGS. 3 and 6. The tightening pressure is adjusted by a nut 68 to the required feeding force. The bending shaft 12 executes during the bending of a pipe bend the same rotary movement as the revolving disk 16 and is turned back to the zero position after completion of the bending operation.

At its end face the bending shaft 12 carries a split bending roll 70 and a support 72 for the lower clamping jaw part 22 which corresponds to the fin form. In the zone of the bending jaws 40 the bending shaft 12 is provided with the pinion serration 46 which meshes with the racks 48, 50, bringing about the stroke 144 of the bending jaw 40. At the rear end of the bending shaft 12 a retrieving device is provided. This device consists of a working cylinder 74 which is connected with a guiding wedge 76.

Figure 2:
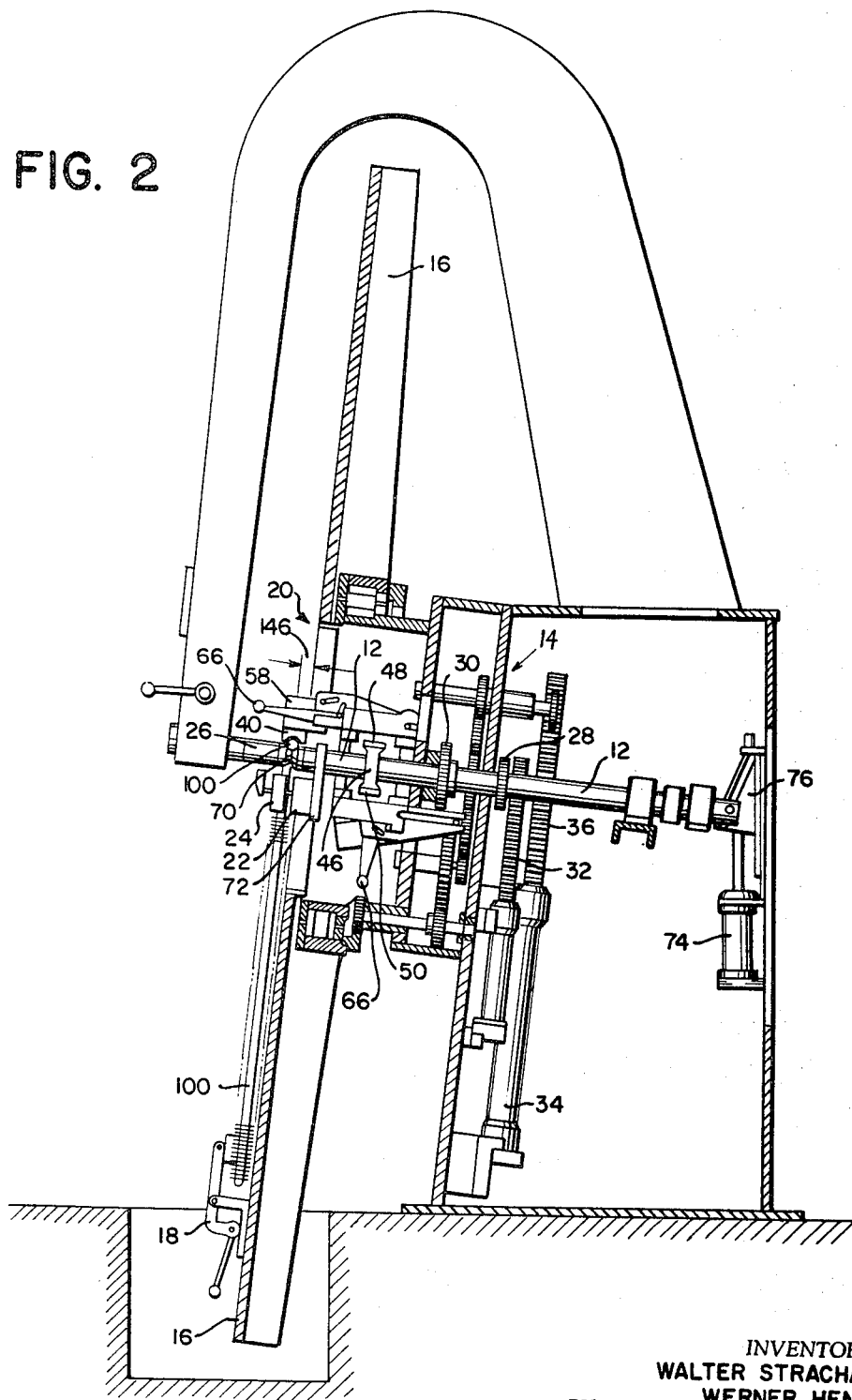
FIG. 2 is a vertical sectional representation of the apparatus shown in FIG. 1.

By a downward movement of the guiding wedge 76 the bending shaft 12 is, as shown in FIG. 2, retracted by the distance 146 until the split bending roll 70 lies below the plane of the disk 16. By the drive mechanism 4, a rotation of the disk and of the bending shaft 12, synchronously and in the same direction of rotation, is achieved during the bending operation, as is evident from FIG. 2. The rotary movement of the revolving disk 16 and of the bending shaft 12 preferably occurs by a hydraulic-mechanical drive. The disk 16 corresponds in its radius to the maximum pipe-coil length to be bent.

The operation of the apparatus has the advantage that the pipe coil or serpentine can be bent without turning over, as this problem becomes more and more difficult with an increasing number of bending points.

The bending of a pipe coil is performed as follows: A straight finned pipe 100 is placed at the first bending point above the split bending roll 70 (see FIGS. 1 to 6). Then the spindle sleeve 26 is pushed forward with the upper part 24 of the clamping jaw, the split bending roll 70 is closed, and the finned portion of the upper and lower clamping jaw parts 22, 24 is clamped. By means of the hand lever 66, the bending jaw 40 is pulled out from the countersink and is flapped against the free end of the finned pipe 100 by rotation of the hand lever 66, the thread turns 44 of the thread-shaped half-shell 42 of the bending jaw 40 being introduced between the ribs 106 of pipe 100 and pressing on the basic outside pipe diameter 174. By further rotation of the hand lever 66, the clamping part 60 above the eccentric 64 is pressed firmly against the T-shaped strip 52. The magnitude of the pressing force is so adjusted by the nuts 68 that the feeding force is adapted to the required compression at the pipe bend 104.

The lower bending jaw 40 is then lowered below the plane of the table so that the seat 72 with the pipe end fastened thereto is freely movable. By the working cylinder 34, the rack 36 is pulled down, whereby the revolving disk 16 and the bending shaft 12 are rotated until the pipe leg strikes against the free end of the finned pipe 100. After the first bend is produced, the spindle sleeve 26, with the upper clamping jaw part 24 and the split bending roll 70, is released and retracted. After this operation, the bending jaw 40 is flapped off the pipe by means of hand lever 66 and pushed back into the countersink or opening 20. By the working cylinder 74, the guiding wedge 76 is pulled downward, owing to which the bending shaft 12 is pulled back by the distance 146. At that, the pinion 28 of the bending shaft 12 comes into engagement in the rack 32, and the gear 30 is separated from the drive mechanism 14. The bending shaft 12 is thereby turned back into the zero position.

The plane of the disk 16 is not blocked by any projecting part, so that the finned pipe 100 can be displaced unhindered to the next bending point. Through the actuation of the working cylinder 74, the bending shaft 12 is pushed forward again, so that the split bending roll 70 and the lower clamping jaw part 22 again protrude from the disk 16. The lower clamping jaw part 22 is pushed downward on the support 72 and the pipe section to be bent is pressed into the thread-shaped half-shell 42. Now the pipe lies with its bending point below the split bending roll 70. The bending roll is closed again by the displacement of the spindle sleeve 26, as in the first bending operation already described. By means of clamping elements 18 secured to the revolving disk 16, the pipe coil or serpentine 100 is fastened on the disk. The rack 36 is now pushed upward by the working cylinder 34, so that the disk 16 and the bending shaft 12 are rotated.

For the sake of completeness, it should be noted that FIG. 2 illustrates a few machine elements which are not identified by reference numerals but, it is believer, the operation and purpose of which is self-explanatory. Thus, for example, it will be clear that the disk 16 has a gear ring attached at its rear, driven by a pinion (visible underneath the lower hand lever 66). The pinion can be brought into operative engagement with the lowermost gear of the drive 14. It will also be clear from FIG. 2 that the hydraulic operating cylinder of rack 32 is similar to cylinder 34 which operates the other rack 36. The apparatus may, of course, be provided with conventional control organs which may be electric, hydraulic or a combination of these, with mechanical control elements interacting in a conventional manner. These elements have been omitted from FIG. 2 (and the other FIGS. 1 and 3 to 6 of the apparatus), for the sake of clarity.

It may also be noted that within the pipe 100 shown in FIGS. 4 and 5, a conventional spacing plug is shown which keeps the pipe from collapsing or being deformed during the bending operation. The plug, attached to a flexible rod or cable of sufficient length, is advanced only far enough to reach the pipe bend 104 (see FIG. 5). These and other details of lesser importance will be understood by those skilled in the art.

A preferred manner of carrying out the inventive process will be explained with reference to FIGS. 8 to 13. It should be noted that some of the reference numerals appear in other views where their application appeared to be more justified.

Figure 8:
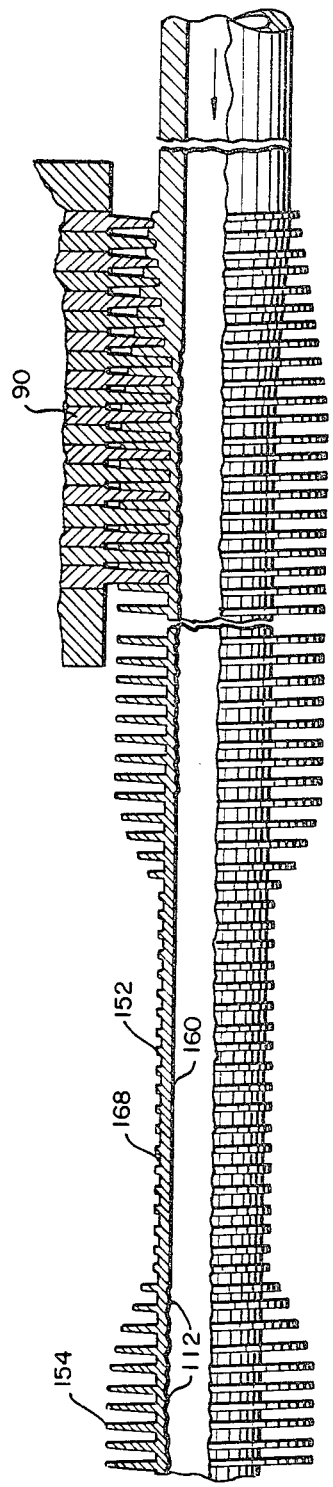
FIG. 8 is a partly sectional longitudinal view of a finned pipe section during the rolling operation in a known apparatus, and serving to illustrate a preferred manner of carrying out the inventive process, together with FIGS. 9 to 13.
Figure 9:
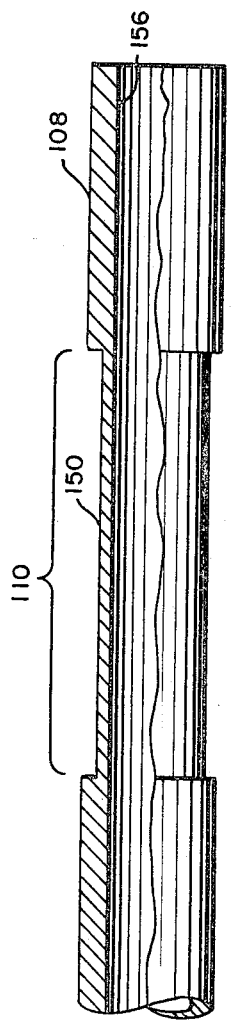
FIG. 9 is a similar view of a smooth pipe section having portions reduced to the basic outside diameter, also during the rolling operation in a known apparatus.
Figure 11:
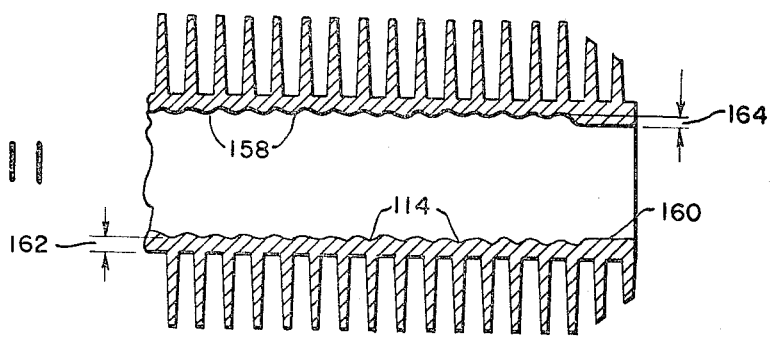
FIG. 11 is a sectional, enlarged illustration of a finned pipe section with large fin height.

In practising the invention according to the aforementioned figures, a smooth pipe 108 is reduced, as FIG. 9 illustrates, at predetermined pipe section 110, at a distance or interval 148 (see FIGS. 13 and 14), by a machining operation with or without material removal, to a basic outside pipe diameter 150 (FIG. 9), the length of the pipe section 110 being so dimensioned that it suffices for one pipe bend 104. The basic pipe diameter 150 is so chosen that on rolling over of the pipe section 110, a reduced outside fin diameter 152 results (FIG 8). By the rolling of the fin to an outside fin diameter 154, the inner wall of the pipe is provided with corrugations 112, as shown in FIG. 8. Thereby the original inside pipe diameter 156 is changed, as the enlarged representation of FIG. 11 shows. The fin is rolled helically onto the smooth pipe 108. The corrugations 112 below the fins extend with the same pitch at the inner wall of the pipe.

Although the diameter of an internally corrugated pipe 108, as shown in FIG. 11, is only slightly greater than the diameter of a smooth pipe 160, there occurs a substantial reduction of the pipe-wall thickness 162 at depressions 114 of the internally corrugated pipe. Due to the considerable reduction of the pipe-wall thickness and the notch effect, such a pipe section can be bent only with relatively large bending radii.

As FIG. 11 shows, on the contrary, at the pipe sections with low fins, no reduction of the pipe-wall thickness occurs, as the inner pipe wall remains completely smooth at these points and, moreover, the diameter of the smooth pipe 160 is smaller by double the wall-thickness difference 164 than the outside diameter of the corrugations 114.

After the rolling of the pipe, the bending points in pipe section 110 are subjected to an annealing step, whereby the pipe material, preferably pure aluminum, is brought into the soft state.

Thereafter, by means of the pipe bending apparatus for cross-rolled finned pipes, for example as shown in FIGS. 1 to 7, the straight finned pipe 100a is provided at the pipe sections with reduced outside diameter 152 of the fins (FIG. 8) alternately with pipe bends 102a as shown in FIG. 12, and is bent in serpentine form. The light fin formation with the outside fin diameter 152 supports the outside wall of the pipe in bending, so that the known collapse of the pipe cross-section at the outer wall of the pipe is counteracted.

By this bending method, bending radii can be bent on cross-rolled finned pipes at a bending ratio of an average or mean bending radius 166 to a basic outside pipe diameter 168 (FIG. 8) of approximately 1:1. In the production of finned pipe registers from cross-rolled finned pipes by this method, it is achieved that the mutually parallel pipe sections with the outside fin diameter 154 can be arranged side by side at a minimum distance, indicated at 170 in FIG. 12.

According to another manner of practising the invention, the smooth pipe 108 is rolled on a finned-pipe rolling machine, as represented in FIG. 15. At predetermined pipe sections 116 (FIG. 16), in the passage of the entire pipe length, roll sets 90 of the known pipe rolling machine are moved farther away from the pipe center by a stroke 172, owing to which the basic outside pipe diameter 174 is increased at these points to a basic outside pipe diameter 176. The pipe sections rolled with the outside fin diameter 154 (FIG. 18) form in the finned pipe register or serpentine the straight pipe sections at which no bending is carried out.

According to FIG. 15, a reduced fin height 178 is lower by about 20% than a fin height 180, while a pipewall thickness 182 is greater by the stroke 172 of the roll sets 90 and by a shaft depth 184 than the wall thickness in the pipe section with the outside fin diameter 154. The greater wall thickness, in conjunction with an approximately smooth inner wall of the pipe at a basic inside pipe diameter 186, enables the bending of average bending radii 166 which are smaller than the pipe outside diameter 176.

Such a pipe bend 102b is shown in FIG. 18. By this method, pipes of any length can be cross-rolled, and during the passage of a pipe the necessary number of such pipe-wall thickness increases can be applied, which are brought about at exactly predetermined intervals 148 by a control process of the roll sets 90 on the finned-pipe rolling machine.

Figure 17:
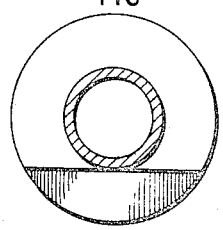
FIG. 17 is a sectional illustration of a finned pipe with flattening, taken along line 17—17 of FIG. 16, with the cutting tool omitted for the sake of clarity.

Following the rolling operation, the fin is removed at the pipe sections 116 provided with fins, preferably by a material removing or chipping operation, as shown in FIGS. 14, 16 and 17. After an annealing step following this operation, the pipe 100b of FIG. 16 is bent on the apparatus according to the invention, as has been described before, so as to result in a bend 102b as shown in FIG. 18.

In FIG. 17 it is shown that the basic outside pipe diameter 176 of the finned pipe is slightly flattened. By the flattening the compressive forces during the bending operation are reduced in the pipe bend, as the thickening of the pipe wall during the bending operation occurs more easily at the bending points.

By this alternative method, bending radii can be bent on the apparatus of the invention in a bending ratio of mean or average bending radius 166 to basic outside pipe diameter 168, 176 which is less than 1:1, so that finned pipe registers or serpentines can be formed where the pipe spacings 170 (FIGS. 12, 18) correspond to the outside diameter 154 of the fins.

The foregoing disclosure relates only to a preferred, exemplary embodiment of the apparatus and to exemplary varients of its operation, which are intended to include all changes and modifications of the examples described which fall within the scope of the invention as set forth in the appended claims.

What we claim is:

1. An apparatus for the production of serpentine-shaped finned pipe registers for heat exchangers, from cross-rolled finned pipes; comprising, in combination, stationary frame means; a bending disk (16) rotatable in said frame means about an axis other than vertical, said disk (16) being provided with a central opening (20); feeding means (10) for a finned pipe (100) to be bent in the apparatus, provided in said opening (20), in the region of a pipe bending point on the outside of said disk (16), said feeding means (10) including a bending shaft (12) concentric with said opening (20) and with said axis of the disk (16); a pinion (46) secured to said bending shaft (12) for movement therewith, two racks (48, 50) rigid with opposite sides of said pinion (46), and friction clutch means, at least one bending device secured to said frame means in the region of said opening (20); said friction clutch means being connected with said bending device and including a stationary block (58), a T-shaped strip (52) slidable in said block (58), and a clamping member (60) for tightening and releasing said friction clutch means; said bending device including a bending jaw (40) fastened to said strip (52); and drive means (14) for operating said disk (16) and said bending shaft (12).

2. The apparatus as set forth in claim 1, wherein said axis about which said disk (16) is rotatable is inclined with respect to the horizontal; and further comprising means for rotating said disk (16) together with said bending shaft (12), by way of said drive means (14), by about 180 degrees in both directions of rotation, for making bends on alternate sides of said finned pipe (100).

3. The apparatus as set forth in claim 1, further comprising means for pivotally moving said bending device with said jaw (40) between an operative position in the region of said bending point on the outside of said disk (16) and an inoperative position behind said disk.

4. The apparatus as set forth in claim 1, wherein the outer end of said bending shaft (12) carries a split bending roll (70) and a radial support (72), the latter holding a clamping jaw portion (22); and further comprising means for withdrawing said bending shaft (12), including a hydraulic cylinder (74), a guiding wedge (76) operated by said cylinder (74), the inner end of said bending shaft (12) being connnected with said wedge (76), and a pinion (28) rigid with said bending shaft (12), adapted for engagement with a rack (32) operated by said drive means (14) when said hydraulic cylinder (74) is energized, whereby said bending shaft (12) is turned back to the starting position.

5. The apparatus as set forth in claim 4, further comprising means for mounting said clamping jaw portion (22) on said support (72) for selective displacement tangentially to a bending radius (140) to be applied to said finned pipe (100), and at an angle of about 90 degrees with respect to the axis of said pipe (100).

6. The apparatus as set forth in claim 4, wherein both said bending jaw (40) and said clamping jaw portion (22) are provided with screw thread-shaped half-shells (42), adapted to engage the fins (106) of said pipe (100).

References Cited

UNITED STATES PATENTS

| | | | |
|---|---|---|---|
| 2,126,235 | 8/1938 | Wesley | 72—150 |
| 2,855,018 | 10/1958 | Stikeleather | 72—150 |
| 3,243,982 | 4/1966 | Steel | 72—150 |

CHARLES W. LANHAM, *Primary Examiner.*

RONALD D. GREFE, *Assistant Examiner.*